(12) United States Patent
Somerfield

(10) Patent No.: US 11,236,815 B2
(45) Date of Patent: Feb. 1, 2022

(54) BALLNUT LUBRICATION

(71) Applicant: Goodrich Actuation Systems Limited, Solihull (GB)

(72) Inventor: Michael Somerfield, Staffordshire (GB)

(73) Assignee: GOODRICH ACTUATION SYSTEMS LIMITED, Solihull (GB)

( * ) Notice: Subject to any disclaimer, the term of this patent is extended or adjusted under 35 U.S.C. 154(b) by 158 days.

(21) Appl. No.: 16/454,368

(22) Filed: Jun. 27, 2019

(65) Prior Publication Data

US 2020/0003296 A1 Jan. 2, 2020

(30) Foreign Application Priority Data

Jun. 27, 2018 (EP) .................................... 18275093

(51) Int. Cl.
*F16H 57/04* (2010.01)
*F16H 25/22* (2006.01)
*F16H 25/24* (2006.01)

(52) U.S. Cl.
CPC ..... *F16H 57/0497* (2013.01); *F16H 25/2204* (2013.01); *F16H 25/2418* (2013.01)

(58) Field of Classification Search
CPC ............. F16H 57/0497; F16H 25/2204; F16H 25/2418; F16C 33/6659; F16C 29/0611; F16C 29/0685; F16C 33/6655
See application file for complete search history.

(56) References Cited

U.S. PATENT DOCUMENTS

| | | | | |
|---|---|---|---|---|
| 2,793,593 | A * | 5/1957 | Klein | F16N 13/22 417/459 |
| 3,132,719 | A * | 5/1964 | Cole | F16H 57/0497 184/65 |
| 3,384,018 | A * | 5/1968 | Mueller | F16N 25/02 417/401 |
| 5,168,767 | A * | 12/1992 | Morita | F16H 25/2204 184/99 |
| 5,387,083 | A * | 2/1995 | Larson | B64C 27/615 416/23 |
| 5,809,838 | A * | 9/1998 | Miyaguchi | F16H 25/2214 74/89.44 |

(Continued)

FOREIGN PATENT DOCUMENTS

JP 2017211043 A 11/2017

OTHER PUBLICATIONS

Extended European Search Rejport for International Application No. 18275093.5 dated Dec. 11, 2018, 8 pages.

*Primary Examiner* — Zakaria Elahmadi
(74) *Attorney, Agent, or Firm* — Cantor Colburn LLP

(57) ABSTRACT

A ballscrew assembly comprises: a nut having a nut body with a radially inner surface and a helical groove formed on the radially inner surface; a screw shaft disposed within the nut, the screw shaft comprising a radially outer surface and a groove formed on the outer surface, the groove on the screw shaft cooperating with the groove on the nut to define a helical raceway for a plurality of balls; at least one lubricant reservoir formed in the nut body at or adjacent to an end of the helical raceway; and a lubricant passage extending through the nut body and fluidly coupled to the at least one lubricant reservoir; wherein the lubricant reservoir is fluidly linked to the helical groove of the nut via the lubricant passage.

5 Claims, 4 Drawing Sheets

(56) References Cited

U.S. PATENT DOCUMENTS

| | | | |
|---|---|---|---|
| 6,186,015 B1* | 2/2001 | Regueiro | F16H 25/2204 74/424.9 |
| 6,247,556 B1 | 6/2001 | Chen | |
| 6,607,059 B1* | 8/2003 | Kapaan | F16H 25/2418 188/72.8 |
| 6,691,837 B1* | 2/2004 | Kapaan | F16H 57/0497 188/72.1 |
| 6,732,600 B2* | 5/2004 | Greubel | F16C 19/184 74/424.71 |
| 6,752,245 B2* | 6/2004 | Tsukada | F16H 25/2418 184/5 |
| 7,234,368 B1* | 6/2007 | Lin | F16H 25/2214 74/424.83 |
| 8,893,570 B2* | 11/2014 | Chuo | F16H 57/0497 74/89.44 |
| 9,156,400 B2* | 10/2015 | Ishii | B60R 21/2037 |
| 10,267,408 B2* | 4/2019 | Kang | F16H 25/2204 |
| 2002/0185336 A1* | 12/2002 | West | F16H 25/2214 184/5 |
| 2004/0007426 A1 | 1/2004 | Keller et al. | |
| 2008/0257080 A1* | 10/2008 | Singh | F16H 57/01 74/89.23 |
| 2009/0133520 A1* | 5/2009 | Chen | F16H 57/0497 74/89.44 |
| 2010/0219621 A1* | 9/2010 | Sasaki | B60Q 5/003 280/731 |
| 2010/0288063 A1* | 11/2010 | Wu | F16H 25/2418 74/89.4 |
| 2010/0294056 A1* | 11/2010 | Lin | F16H 57/0497 74/89.44 |
| 2012/0042741 A1* | 2/2012 | Jacob | F16H 57/0464 74/89.44 |
| 2012/0144944 A1* | 6/2012 | Yamamoto | F16H 57/0412 74/424.81 |
| 2013/0081490 A1* | 4/2013 | Chiang | F16H 57/0406 74/89.44 |
| 2014/0013887 A1* | 1/2014 | Chang | F16H 57/0406 74/424.82 |
| 2014/0260747 A1* | 9/2014 | Kuroiwa | F16H 25/2204 74/424.81 |
| 2015/0184696 A1* | 7/2015 | Chang | F16C 29/0602 384/13 |
| 2015/0226266 A1* | 8/2015 | Mori | F16C 33/6662 384/467 |
| 2015/0330497 A1* | 11/2015 | Amano | F16H 57/0464 74/89.41 |
| 2016/0169104 A1* | 6/2016 | Rowe | F04D 27/023 251/129.12 |
| 2017/0023124 A1* | 1/2017 | Minakuchi | F16H 57/0497 |
| 2017/0146114 A1* | 5/2017 | Chen | F16H 57/045 |
| 2017/0211687 A1* | 7/2017 | Furusawa | F16H 25/24 |
| 2018/0306310 A1* | 10/2018 | Davies | F16H 25/2214 |
| 2019/0078681 A1* | 3/2019 | Lin | F16C 29/0692 |
| 2019/0353230 A1* | 11/2019 | Kajihara | F16C 19/18 |

* cited by examiner

BALLNUT LUBRICATION

FOREIGN PRIORITY

This application claims priority to European Patent Application No. 18275093.5 filed Jun. 27, 2018, the entire contents of which is incorporated herein by reference.

TECHNICAL FIELD

The present disclosure relates to ballscrew actuators, and in particular to lubricated return tracks for ballscrew actuators.

BACKGROUND

It is known to use ballscrew actuators to translate a rotational displacement into an axial displacement while minimising frictional losses. Ballscrew actuators are used in a variety of applications, in particular for translating various components of aircraft and aircraft engines, for example high lift systems and horizontal stabilisers, such as a Trimmable Horizontal Surface Actuator ("THSA").

Ballscrew actuators are generally lubricated in order to facilitate relative motion between the screw, nut and ball bearings. In use, some leakage of lubricant from the ballscrew generally occurs. It is desirable to minimise this leakage to maximise the period between reapplications of the lubricant.

It is desired to improve the lubrication of the ballscrew actuator.

SUMMARY

In an aspect of the present disclosure, there is provided a ballscrew assembly comprising: a nut having a nut body with a radially inner surface and a helical groove formed on the radially inner surface; a screw shaft disposed within the nut, the screw shaft comprising a radially outer surface and a groove formed on the outer surface, the groove on the screw shaft cooperating with the groove on the nut to define a helical raceway for a plurality of balls; at least one lubricant reservoir formed in the nut body or adjacent to an end of the helical raceway; and a lubricant passage extending through the nut body and fluidly coupled to the at least one lubricant reservoir; wherein the lubricant reservoir is fluidly linked to the helical groove of the nut via the lubricant passage.

The above features have been found to improve the transport of lubricant to the helical groove formed between the screw and the nut, as well as reducing the loss of lubricant through the end portions of the nut, since the lubricant reservoirs act to pick up this lubricant and return it to the helical groove, which lubricant would otherwise be forced out of the end of the nut and lost to the surrounding system.

Various embodiments further comprise at least one seal disposed between the at least one lubricant reservoir and an axial end of the nut, the seal sealingly engaging the nut and the screw shaft. This position of the seal means that it is positioned most effectively when combined with a lubricant reservoir as described.

In various embodiments, the at least one lubricant reservoir comprises a first lubricant reservoir and a second lubricant reservoir, each disposed at opposing axial ends of the nut body. This means that the lubricant reservoirs can function to collect and distribute lubricant when the nut is travelling in both directions along the screw shaft.

Various embodiments further comprise a first seal located axially between the first lubricant reservoir and a first end of the nut, and a second seal located axially between the second lubricant reservoir and a second end of the nut, wherein each of the seals engages with both the nut and the ballscrew. This position of the seals means that they are positioned most effectively when combined with lubricant reservoirs as described.

In various embodiments, the ballscrew assembly comprises a plurality of ball circuits, each ball circuit comprising a portion of the helical raceway and a return track, the respective portions of the helical raceway axially spaced from one another. Lubricant reservoirs as described herein are particularly effective when combined with embodiments involving ball circuits, since such embodiments require efficient distribution and retention of lubricant.

Various embodiments further comprises at least one lubricant port, fluidly connecting the lubricant passage and the helical raceway. Such a port fluidly connects the lubricant reservoir with the helical raceway (via the lubricant passage) and may take any suitable form. The at least one port may have a common diameter, which may be less than a diameter of the plurality of balls.

In various embodiments, the at least one port comprises a plurality of ports, each port fluidly connecting the lubricant passage and the helical raceway and at a different location along the helical raceway. The different locations may be selected such that lubricant is dispersed from the lubricant reservoir(s) in the most efficient manner, and for any particular application. For example, in embodiments involving the use of ball circuits, each port may fluidly connect the lubricant passage and a different ball circuit of the helical raceway, providing further advantages for such embodiments. However, the use of multiple ports is considered advantageous even without the use of ball circuits, and should not be considered as being limited to such embodiments.

In various embodiments, the lubricant passage and the at least one port have a common (e.g., substantially the same) diameter. This enhances the flow of lubricant through the port(s), since the lubricant is able to flow freely between the lubricant passage and the helical raceway. The common diameter may be less than a common diameter of the plurality of balls, which can distinguishes the ports from, e.g., a passage for the balls. Alternatively, suitable blocking devices could be positioned at the exit of the port(s) at the helical raceway, to prevent balls from entering the ports if they had a large enough diameter. The diameter of the port(s) may be substantially the same along the entirety of its or their length.

In various embodiments, the at least one lubricant reservoir is defined by a chamber that extends along a portion of the axial length of the nut adjacent to the radially outer surface of the screw shaft. The radially outer surface of the screw shaft may form part of the at least one lubricant reservoir. These embodiments provide a particularly effective location for the lubricant reservoir(s), since they are positioned close (or at) the location at which lubricant is forced out of the helical raceway.

Various embodiments further comprise a track wiper formed in the nut body and configured to pick up lubricant from a radially outer surface of the screw shaft and transport it to the helical raceway. Such track wipers can help to move lubricant from inactive areas of the assembly to an active area of the assembly, as discussed in more detail below. The track wiper may terminate in an angled end, the angled end having an edge at least part of which is non-parallel with the ballscrew axis, which means that lubricant may be diverted by the track wiper into the helical raceway as the nut travels along the screw shaft. In embodiments, the angled end forms a radial clearance from an adjacent surface of the screw shaft, the radial clearance being less than or equal to about 25 μm. This range of distances has been found to provide particularly effective transport of lubricant.

In various embodiments, the track wiper is formed from polyether ether ketone ("PEEK") or nylon. These materials are particularly effective at transporting lubricant as aforesaid, whilst being able to accommodate relative movement between the nut and the screw shaft.

Various embodiments further comprise an aperture extending through the nut body from a radially outer surface to a radially inner surface thereof, a lubricant injection assembly disposed in the aperture, the lubricant injection assembly having an adaptor with a central bore and a flow restrictor disposed in the central bore, wherein the flow restrictor defines a ring shape having an open ring centre and the ring centre has a diameter less than a diameter of the central bore. The use of a lubricant injection assembly may combine with the use of reservoirs as described above and herein to optimise the amount of lubricant within the ballscrew assembly.

In an aspect of the disclosure, there is provided a method of controlling lubricant within a ballscrew assembly as described above, when combined with a lubricant injection assembly, the method comprising injecting lubricant into the ballscrew assembly using the lubricant injection assembly. In embodiments, the method may comprise injecting the lubricant into the ballscrew assembly when the volume of lubricant within the lubricant reservoir(s) falls below a predetermined amount.

In any of the methods or assemblies described above involving a lubricant injection assembly, the adaptor may protrude radially from an outer surface of the nut body such that a lubricant injector disposed in the adaptor has a maximum height between about 4 mm and about 9 mm from the outer surface of the nut body. This provides an optimum distance when disposing a lubricant injector in the adaptor.

In various embodiments, the aperture may be axially aligned with and fluidly linked to the at least one lubricant reservoir. This advantageously means that lubricant can be directly injected into the lubricant reservoir using the lubricant injection assembly.

In an embodiment, at least a portion of the lubricant injection assembly is formed of steel or a steel alloy, which is a particularly suitable material when using the lubricant injection assembly in embodiments described herein.

DETAILED DESCRIPTION

Figure 1:
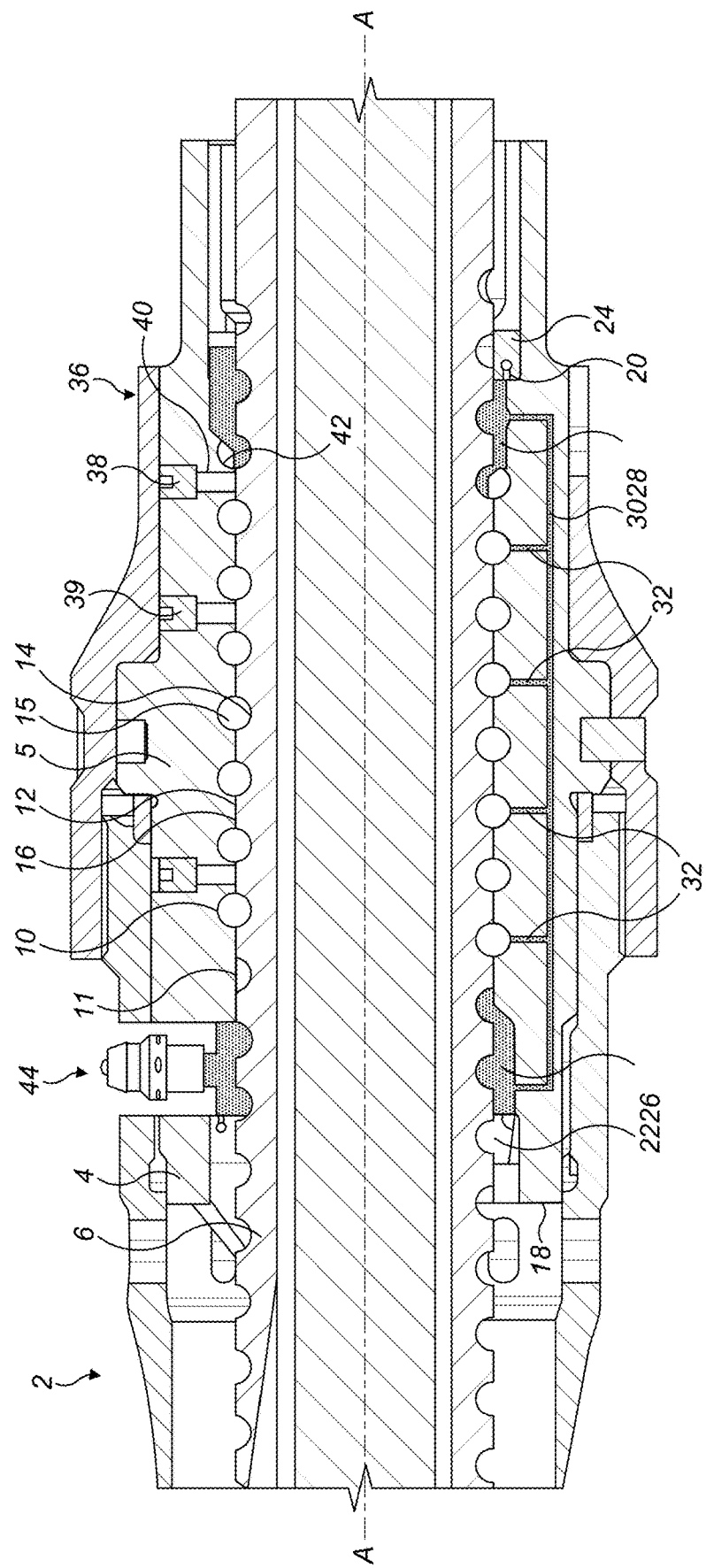
FIG. 1 shows a ballscrew assembly in accordance with an embodiment of the present disclosure.

FIG. 1 shows a ballscrew assembly 2 in accordance with an embodiment. The ballscrew assembly comprises a screw shaft 6 that is rotatable about an axis A, and a nut 4 configured to translate along the axis A upon rotation of the screw shaft 6. As is known in the art, a plurality of balls (not shown) are provided to facilitate the nut 4 moving along the screw shaft 6 in this manner.

The nut 4 comprises a body 5 that surrounds the screw shaft 6 (e.g., concentrically), wherein the body 5 includes a helical groove 10 formed on a radially inner surface 11 thereof.

The screw shaft 6 includes a helical groove 14 formed on a radially outer surface 15 thereof. The helical groove 14 on the screw shaft 6 cooperates with the helical groove 10 on the body 5 of the nut 4 such that, when the screw shaft 6 is disposed within the nut 4, the balls sit between the screw shaft 6 and the body 5 within the space between the helical grooves 10, 14. The screw shaft 6 is rotatable within the nut body 5, and the nut 4 is fixed against rotation, which causes the screw shaft 6 to move along axis A of the nut 4 (and nut body 5). The axis of the screw shaft 6 is coincident with the axis A of the nut 4.

Alternatively, the screw shaft 6 may be fixed against rotation, wherein rotation of the screw shaft 6 may cause the nut 4 to move along the axis A.

The helical grooves 10, 14 on the nut body 5 and screw shaft 6 define a helical raceway for the balls. As the screw shaft 6 rotates, the balls progress through the helical raceway in a given direction that depends on the rotational direction of the screw shaft 6. The balls may travel through one or more ball circuits 8A-8E that are each formed by a portion of the helical raceway and a respective return track 9A-9E (see FIG. 1A). In other words, a portion of the helical raceway and a return track together form a ball circuit.

Figure 1A:
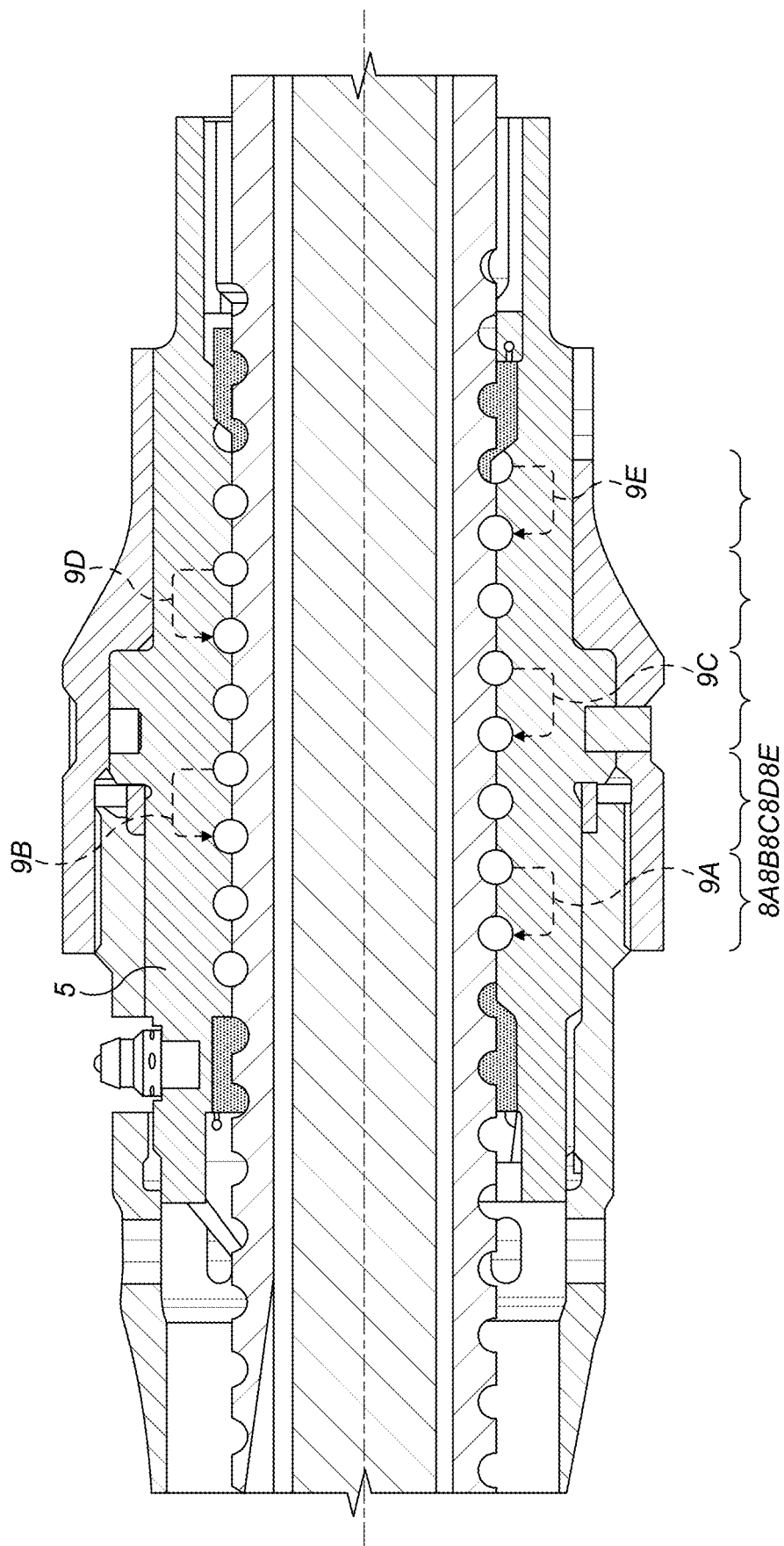
FIG. 1A shows further features of the ballscrew assembly of FIG. 1.

In its simplest form, the ballscrew assembly 2 may have a single ball circuit, comprising the entire helical raceway and a single return track which joins the two ends thereof. Alternatively, and as shown in FIG. 1A, a plurality of ball circuits may be formed in the same ballscrew assembly. As shown in FIG. 1A, the present embodiment has five ball circuits 8A-8E, each associated with a portion of the helical raceway and a respective return track 9A-9E. The balls in each ball circuit 8A-8E are introduced into a respective portion of the helical raceway, before passing through the respective return track 9A-9E and back to the point of introduction. The return tracks may take the form of a ball passage through the nut body 5, as in the example shown. The circuits are arranged in series with one another, spaced along the axis A.

The nut 4, screw shaft 6 and balls are typically lubricated to facilitate their relative movement. The ballscrew assembly 2 may, for example, use an oil lubricant, or a grease lubricant. Seal members 22, 24 are provided at opposite ends 18, 20 of the nut 4 and are configured to minimise leakage of lubricant from the helical raceway to an exterior of the ballscrew assembly 2. The seals comprise a first seal 22 near a first end 18 of the nut 4 and a second seal 24 near a second, opposite end 20 of the nut 4. The first end 18 may correspond to an inboard end of the nut 4, and the second end 20 may correspond to an outboard end of the nut 4.

It has been found that the progression of the balls through the helical raceway has the effect of pushing or forcing lubricant along the helical raceway to the first end 18 of the nut 4 or the second end 20 of the nut 4 (depending on the rotational direction of the screw shaft 6 and corresponding direction of travel of the nut 4 or screw shaft 6 along the axis A).

As a result, lubricant can build up in the raceway near one or both of the ends 18, 20 of the nut 4 which, in turn, can create a pressure build-up against the seals 22, 24. This pressure build-up has been found to compromise the sealing capability of the seals 22, 24 and result in an increased leakage of lubricant from the ballscrew assembly 2. Furthermore, as the ballscrew assembly contains a fixed quantity of lubricant, lubricant which is pooled at the ends 18, 20 of the nut 4 is unavailable to lubricate the remainder of the ballscrew assembly 2.

In accordance with the disclosure the ballscrew assembly is provided with one or more lubricant reservoirs 26, 28 formed in the nut body 5, and optionally at respective ends 18, 20 of the nut 4. The embodiment shown comprises a first lubricant reservoir 26 near or adjacent to (or contacting) the first seal 22, and a second lubricant reservoir 28 near or adjacent to (or contacting) the second seal 24. As described in more detail below, the lubricant reservoirs 26, 28 are aimed at solving the problems described above in relation to conventional arrangements.

More specifically, the lubricant reservoirs 26, 28 may be formed or defined by an axially extending, annular chamber located within the nut body 5 and adjacent to the screw shaft 6. The lubricant reservoirs 26, 28 may be annular grooves formed in the nut, and in some embodiments may be axially outside of the helical raceway for the balls. The chambers forming the lubricant reservoirs 26, 28 may extend in a radial direction (i.e., with respect to the axis A) to the same extent as the helical groove 10, such that the lubricant reservoirs 26, 28 form part of the helical raceway for the balls. The lubricant reservoirs 26, 28 may be configured to collect and/or receive lubricant pushed or forced to the respective ends 18, 20 of the nut 4.

Prior to use the ballscrew assembly 2 may be provided with a quantity of lubricant sufficient to fill the lubricant reservoirs 26, 28 with lubricant.

The lubricant reservoirs 26, 28 are fluidly connected to a lubricant passage 30. The lubricant passage 30 extends at least in part generally axially through the nut body 5 to join the lubricant reservoirs 26, 28. Although not illustrated, the lubricant passage 30 could comprise some portions that extend at least partially radially as well. The lubricant passage 30 is also fluidly linked to the helical groove 10 of the nut body 5 via a plurality of lubricant sub-passages or ports 32. The movement of the balls through the helical raceway pressurises the lubricant collected in the lubricant reservoirs 26, 28, forcing lubricant through the lubricant passage 30 and then into the ports 32. Lubricant which would otherwise have collected at the ends 18, 20 of the nut 4 and pressurised the seals 22, 24 is thereby redirected to other portions of the ballscrew assembly 2, relieving pressure on the seals 22, 24 and redistributing pooled lubricant to active areas of the helical raceway.

In the embodiment shown, there are four lubricant ports 32. The lubricant reservoirs 26, 28 are associated with the two outermost ball circuits 8A, 8E. Any number of lubricant ports 32 may be provided to improve distribution of lubricant from the reservoirs 26, 28 to other axial locations in the ballscrew. Alternatively, the ballscrew assembly 2 may function with only two reservoirs 26, 28 and the lubricant passage 30 to pass lubricant therebetween.

The embodiment shown uses a single reservoir 26, 28 at each end 18, 20 of the nut 4. The pressurisation caused by the progression of the balls can force lubricant located between the screw 6 and the nut 4 from one ball circuit to another (for example from first ball circuit 8A to second ball circuit 8B). Hence, a single reservoir 26, 28 at each end of the nut 4, at the ends of the overall helical raceway, can function to collect lubricant from such a multiplicity of ball circuits in the ballscrew assembly 2

The lubricant passage 30 and sub-passages 32 are sized to be as small as possible while functioning to relieve pressure generated against the seals 22, 24. The lubricant passage 30 and lubricant ports 32 may have the same diameter. The diameter of the lubricant passage 30 and/or sub-passages 32 may be smaller than a diameter of the balls. The balls may all have substantially the same (or a "common") diameter. The lubricant sub-passages 32 may be manufactured by drilling the nut body 5.

As described above, the helical grooves 10, 14 on the nut body 5 and screw shaft 6 define the helical raceway. The helical raceway may, therefore, form an active portion of the ballscrew assembly 2, wherein the active portions of the ballscrew assembly may be defined as the portions through which movement of the balls occurs.

The helical groove 10 of the nut body 5 extends to a helical ridge 12, which corresponds to the portion of the radially inner surface 11 between the helical grooves 10. Similarly, the helical groove 14 of the screw shaft 6 extends to a helical ridge 16, which corresponds to the portion of the radially outer surface 15 of the screw shaft 6 between the helical grooves 14. The helical ridges 12, 16 are radially spaced from one another so as not to substantially contact one another and define a gap therebetween. The gap between the helical ridges 12, 16 may be referred to as an inactive portion of the ballscrew assembly, wherein the inactive portions of the ballscrew assembly may be defined as the portions through which the balls do not pass.

As described above, the progression of the balls through the helical raceway has the effect of pushing or forcing lubricant along the axial length of the nut 4. This frequently causes lubricant to be transferred from the active areas of the ballscrew assembly 2 to the inactive areas, e.g., between the helical ridges 12, 16. It is desirable to prevent the build-up of lubricant in inactive areas, and to maximise the amount of lubricant in the active helical raceway, where it performs the function of lubricating the relative movement of the nut 4, screw shaft 6 and balls.

In the embodiment shown, there is at least one track wiper 36 disposed in a cavity 38 formed in the nut body 5. The track wiper 36 has a connecting section 39, which retains the track wiper 36 in the wiper cavity 38. The connecting section 39 may be a screw.

The track wiper 36 further comprises a wiping section 40, arranged with one angled end 42 adjacent to or configured to contact the screw shaft 6 at the helical ridge 16. The wiping section 40 may comprise a pin or an angled blade. The angled end 42 terminates in an edge that is not parallel to the axis A, which assists in moving lubricant towards the active areas of the assembly. The angled end 42 may have only a very small clearance from the helical ridge 16 along the length of the edge, for example a clearance of less than or equal to about 25 μm, or may be in touching contact with the helical ridge 16 at the edge.

During normal actuation of the ballscrew assembly 2, the screw shaft 6 turns relative to the nut 4. This creates relative motion between the angled end 42 of the track wiper 36 and the helical ridge 16 of the screw shaft 6. The angled end 42 functions to push lubricant from the helical ridge 16 into an adjacent portion of the helical groove 14. This results in lubricant being continually moved from an inactive area of the ballscrew assembly 2 to an active area during actuation.

The ballscrew assembly 2 may comprise a plurality of track wipers 36, as in the embodiment shown (although a single track wiper could be used). Each track wiper 36 may be arranged with the angled end 42 proximal a part of the helical ridge 16. Track wipers 36 may be situated wherever inactive areas are identified in the ballscrew assembly 2.

The track wipers 36 may be formed of a polyether ether ketone (PEEK)-based or nylon-based material.

The wiper cavities 38 may be formed by drilling a hole in an outer surface 3 of the nut body 5. The track wipers 36 may be fitted in the wiper cavities by screwing the connecting section 39 into the cavities until the angled end 42 is in contact with the helical ridge 16. The connecting section 39 may then be unscrewed to back the angled end 42 away from contact with the screw shaft 6 and create a clearance as described above.

During maintenance, it may be necessary to re-lubricate the ballscrew assembly 2. To this end, a lubricant gun may be used to supply lubricant from a pressurised source of lubricant. As discussed above, the seals 22, 24 are sensitive to over-pressurisation from inside the ballscrew assembly 2, which can compromise the performance of the seals 22, 24. This over-pressurisation can result from use of a lubricant gun.

Therefore, in various embodiments the ballscrew assembly may be provided with a lubricant injection assembly 44. This combines with the use of lubricant reservoirs to achieve optimum distribution of lubricant throughout the ballscrew assembly.

Figure 2:
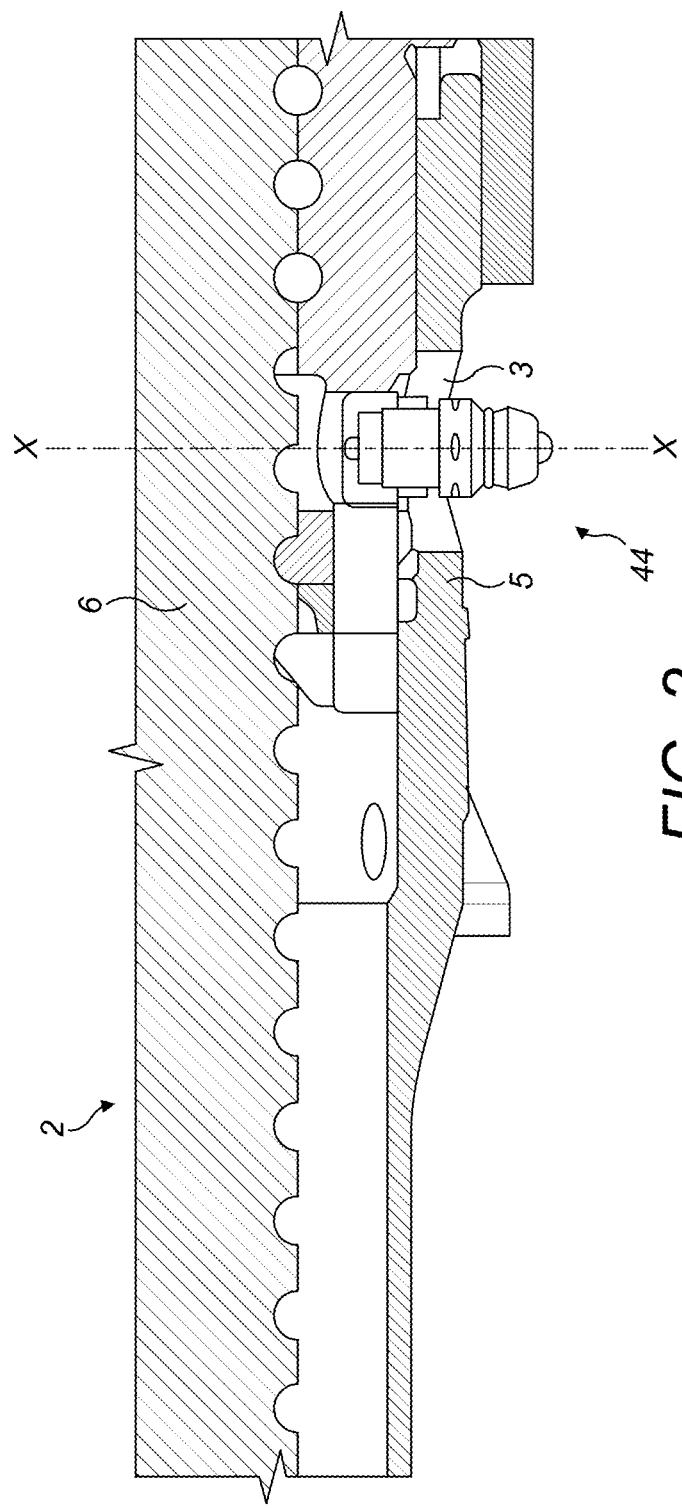
FIG. 2 shows an enlarged view of the lubricant injector assembly included in FIG. 1.
Figure 3:
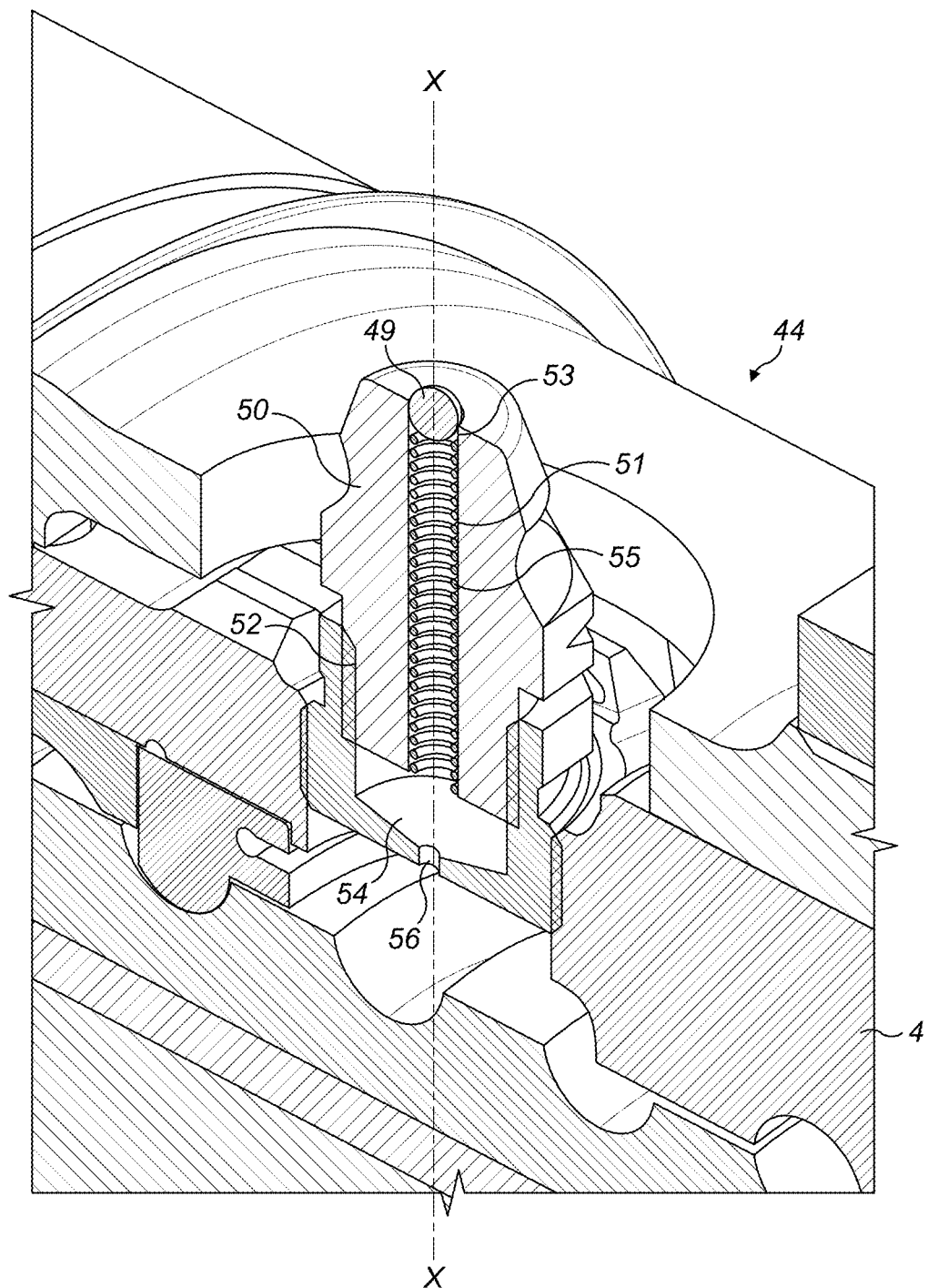
FIG. 3 shows a perspective view of a lubricant injector assembly of FIG. 1.

An embodiment of a lubricant injection assembly 44 is shown in greater detail in FIGS. 2 and 3. The lubricant injection assembly 44 is located in an aperture 46 of the nut body 5, the aperture extending from the radially outer surface 3 to the radially inner surface 11 of the nut body 5 to provide external access to an interior of the nut 4. The lubricant injection assembly 44 is secured within the aperture 46. The aperture 46 defines a longitudinal axis X.

The lubricant injection assembly 44 comprises an injector 50 and an adaptor 48. The adaptor defines a central bore 52, in which the injector 50 is secured. The injector 50 comprises a port 51 extending fully through the injector along the axis X and a moveable member 53 disposed in the port 51. The moveable member 49 may be a ball, as in the example shown. The moveable member 49 is moveable along the axis X within the port 51, and is restrained within the port 51 by the geometry thereof. The moveable member 49 is biased by a spring 55 into contact with an axial end 53 of the port 51 forming an opening to the injector 50. The moveable member 49 blocks the opening to the port 51.

The lubricant injection assembly 44 is sized to receive a lubricant gun. The lubricant gun engages the injector 50. The lubricant gun subsequently provides a pressurised flow of lubricant into the port 51, which forces the moveable member 49 away from the axial end 53 to allow fluid flow through the port 51 and thereby into the interior of the nut 4.

The adaptor 48 is provided with a flow restrictor 54. The flow restrictor 54 is a ring within the central bore 52. The flow restrictor 54 forms an open ring centre 56 with a diameter D1 that is less than a diameter D2 of the central bore 52. Flow can pass through the ring centre 56, but at a restricted rate relative to that through the central bore 52. The flow restrictor 54 functions to reduce the pressure transferred from the grease gun into the ballscrew assembly 2. This prevents over-pressurisation of the seals 22, 24 discussed above.

The flow restrictor 54 may be a frusto-conical shape, and/or may be integrally formed with the adaptor 48.

The adaptor 48 also serves to raise the height of the lubricant injection assembly 44 relative to the outer surface 3 to create a clearance for a lubricant gun. The injector 50 may extend between 4 mm and 9 mm from the outer surface 3, measured at a meeting point of the lubricant injection assembly 44 and the aperture 46.

The component parts of the lubrication injection assembly 44 may be formed from a corrosion resistant material, for example corrosion-resistant steel or steel alloy.

If a first lubricant reservoir 26 is present in the ballscrew assembly 2, the aperture 46 may be axially aligned with the lubricant reservoir 26 with respect to the ballscrew axis A, such that the lubricant injection assembly 44 provides a fluid input directly into the first lubricant reservoir 26.

The ballscrew assembly as described above may be used as part of an aircraft, for example in high lift systems and horizontal stabilisers such as a THSA, or as part of an aircraft engine.

Although the present disclosure has been described with reference to various embodiments, it will be understood by those skilled in the art that various changes in form and detail may be made without departing from the scope of the invention as set forth in the accompanying claims.

The invention claimed is:

1. A ballscrew assembly comprising:
a nut having a nut body with a radially inner surface and a helical groove formed on the radially inner surface;
a screw shaft disposed within the nut, the screw shaft comprising a radially outer surface and a groove formed on the outer surface, the groove on the screw shaft cooperating with the groove on the nut to define a helical raceway for a plurality of balls;
at least one lubricant reservoir formed in the nut body at or adjacent to an end of the helical raceway;
a lubricant passage extending through the nut body and fluidly coupled to the at least one lubricant reservoir, wherein the lubricant reservoir is fluidly linked to the helical groove of the nut via the lubricant passage;
an aperture extending through the nut body from a radially outer surface to a radially inner surface thereof;
a lubricant injection assembly disposed in the aperture, the lubricant injection assembly having an adaptor with a central bore; and
a flow restrictor disposed in the central bore, wherein the flow restrictor defines a ring shape having an open ring centre and the ring centre has a diameter (D1) less than a diameter (D2) of the central bore.

2. The ballscrew assembly of claim 1, wherein the adaptor protrudes radially from an outer surface of the nut body such that a lubricant injector disposed in the adaptor has a maximum height between 4 mm and 9 mm from the outer surface of the nut body.

3. The ballscrew assembly of claim 2, wherein the aperture is axially aligned with and fluidly linked to the at least one lubricant reservoir.

4. The ballscrew assembly of claim 1, wherein the aperture is axially aligned with and fluidly linked to the at least one lubricant reservoir.

5. The ballscrew assembly claim 1, wherein at least a portion of the lubricant injection assembly is formed of steel or a steel alloy.

* * * * *